(12) United States Patent
Border et al.

(10) Patent No.: US 8,823,808 B2
(45) Date of Patent: Sep. 2, 2014

(54) METHOD FOR IMPROVED DIGITAL VIDEO IMAGE QUALITY

(75) Inventors: John N. Border, Walworth, NY (US);
Aaron T. Deever, Pittsford, NY (US);
Efrain O. Morales, Rochester, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 425 days.

(21) Appl. No.: 12/606,480

(22) Filed: Oct. 27, 2009

(65) Prior Publication Data

US 2011/0096179 A1    Apr. 28, 2011

(51) Int. Cl.
*H04N 5/228* (2006.01)
*H04N 5/225* (2006.01)
*H04N 5/262* (2006.01)
*H04N 5/235* (2006.01)
*H04N 5/232* (2006.01)

(52) U.S. Cl.
CPC ......... *H04N 5/23267* (2013.01); *H04N 5/2253* (2013.01); *H04N 5/2625* (2013.01); *H04N 5/2351* (2013.01)
USPC ...................................................... 348/208.4

(58) Field of Classification Search
CPC .. H04N 5/2352; H04N 5/2353; H04N 5/2351
USPC ...................................................... 348/208.4
See application file for complete search history.

(56) References Cited

U.S. PATENT DOCUMENTS

| | | | |
|---|---|---|---|
| 3,971,065 A | 7/1976 | Bayer | |
| 5,335,041 A | 8/1994 | Fox | |
| 5,485,242 A * | 1/1996 | Sato et al. | 396/243 |
| 5,652,621 A | 7/1997 | Adams | |
| 6,441,848 B1 | 8/2002 | Tull | |
| 7,602,418 B2 | 10/2009 | Border et al. | |
| 2005/0275747 A1* | 12/2005 | Nayar et al. | 348/362 |
| 2006/0274156 A1 | 12/2006 | Rabbani et al. | |
| 2008/0043112 A1* | 2/2008 | Nikkanen et al. | 348/217.1 |
| 2008/0088711 A1* | 4/2008 | Border et al. | 348/222.1 |
| 2008/0205848 A1* | 8/2008 | Kobayashi | 386/94 |
| 2009/0096896 A1* | 4/2009 | Imafuji et al. | 348/234 |
| 2010/0053345 A1* | 3/2010 | Kim et al. | 348/208.4 |

* cited by examiner

*Primary Examiner* — Antoinette Spinks

(57) ABSTRACT

A method of producing a digital video with reduced motion blur or increased brightness, including capturing a digital video using an exposure time that reduces image blur; selecting a first series of sequential images from the digital video capture; combining pixel values of said images to produce a first intermediate image that is brighter than each of the selected sequential images; choosing and processing a reference image to create a second intermediate image that is less blurry than the first intermediate image; identifying moving regions among the selected sequential images; replacing pixel values of moving regions in the first intermediate image with corresponding pixel values from the second intermediate image to produce a first digital video image having reduced motion blur or increased brightness; and repeating these steps for a second series of sequential images that includes at least one image from the first series of sequential images.

20 Claims, 11 Drawing Sheets

METHOD FOR IMPROVED DIGITAL VIDEO IMAGE QUALITY

FIELD OF THE INVENTION

This invention relates to producing a digital video with improved image quality, and in particular to producing a digital video with reduced motion blur or increased brightness.

BACKGROUND OF THE INVENTION

An electronic imaging system depends on a lens system to form an image on an electronic image sensor to create an electronic representation of a visual image. Examples of such electronic image sensors include charge coupled device (CCD) image sensors and active pixel sensor (APS) devices (APS devices are often referred to as CMOS sensors because of the ability to fabricate them in a Complementary Metal Oxide Semiconductor process). A sensor consists of a two-dimensional array of individual picture element sensors, or pixels. Each pixel is typically provided with either a red, green, or blue filter, as described by Bayer in commonly assigned U.S. Pat. No. 3,971,065 issued Jul. 20, 1976, so that a full color image can be produced. Regardless of electronic technology employed, e.g., CCD or CMOS, the pixel acts as a bucket in which photoelectrons are accumulated in direct proportion to the amount of light that strikes the pixel during the capture of an image by the electronic imaging system.

Not all of the light that enters the front optical element of an electronic imaging system strikes a pixel. Much of the light is lost when passing through the optical path of the electronic imaging system. Typically, about 5% of the light is lost due to lens reflections and haze and about 60% is lost because of the color filter array. Moreover, some of the light strikes areas of the pixel that are not light sensitive. To gather the amount of light that is necessary to make a correct exposure, the electronic imaging sensor must gather light for an interval of time called the exposure time. Based on brightness measurements of the scene to be imaged, the electronic imaging system, typically an automatic exposure control, is employed to determine a suitable exposure time that will yield an image with effective brightness. The dimmer the scene, the larger the amount of time the electronic imaging system must gather light to make a correct exposure. If objects in the scene are moving during capture, a longer exposure time may result in an image with object motion blur. Object motion blur is different from image capture device-induced blur which is produced when the image capture device is moving relative to the scene during capture and is present in an entire image. Methods to reduce image capture device-induced blur are well known to those in the field. One method is to use a gyroscopic device to measure image capture device motion and then use a special lens with a lens element that can be moved laterally to cause the image on the electronic image sensor in the image capture device to move in a direction that compensates for the camera motion. A second method is described in U.S. Patent Publication 2006/0274156 by Rabbani et al. This method is based on a digital shifting of images in a video capture to compensate for movement of the digital camera and reduce image capture device-induced blur and to stabilize the images in the video.

One method to reduce object motion blur is to shorten the exposure time. This method under-exposes the electronic image sensor during image capture so dark images are generated. An analog or digital gain can be applied to the image signal to brighten the dark images, but those skilled in the art will recognize that this will result in noisy images.

Another method to reduce object motion blur is to shorten the exposure time and gather more light with a larger aperture lens and larger pixels on the electronic image sensor. This method can produce images with reduced object motion blur and acceptable noise levels. However, the current industry trend in electronic imaging systems is to make imaging systems smaller and less expensive. High-grade optical elements with large apertures and electronic image sensors with larger pixels, which can gather more light and preserve more light passing through them, are therefore not practicable.

Another method to reduce object motion blur is to shorten the exposure time and supplement the available light with a photographic flash. A photographic flash produces a strong light flux that is sustained for a fraction of a second and the exposure time is set to encompass the flash time. The exposure time can be set to a significantly shorter interval than without a flash since the photographic flash is strong. Therefore, the blur caused by object motion during the exposure is reduced. However, objects in bright daylight can still have motion blur and flash photography is typically only useful if the distance between the flash and the object is small. In addition, flash photography tends to produce artifacts such as red eyes and very bright areas and dark areas which many people find objectionable.

U.S. Pat. No. 6,441,848 by Tull describes a digital camera with an electronic image sensor that removes object motion blur by monitoring the rate at which electrons are collected by each pixel. If the rate at which light strikes a pixel varies, then the brightness of the image that the pixel is viewing must be changing. When a circuit built into the sensor array detects that the image brightness is changing, the amount of charge collected is preserved and the time at which brightness change was detected is recorded. Each pixel value where exposure was stopped is adjusted to the proper value by linearly extrapolating the pixel value so that the pixel value corresponds to the dynamic range of the entire image. A disadvantage of this approach is that the extrapolated pixel values, of an object that is already in motion when the exposure begins, are highly uncertain. The image brightness, as seen by the sensor, never has a constant value and, therefore, the uncertainty in the extrapolated pixel values results in an image with motion artifacts. Another disadvantage is that it uses specialized hardware so it cannot be used with the conventional electronic image sensors that are used in current commercial cameras.

U.S. Pat. No. 7,602,418 by Border et al. describes a method for producing a still image with reduced motion blur.

A digital video comprises a sequence of digital images. Individual images in the digital video can have object motion blur. Additionally, the exposure of an individual video image is constrained by the frame rate of the video capture. Thus a video image can also be underexposed, resulting in a dark image. Application of analog or digital gain results in a noisy video image. Both motion blur and noise affect the image quality of a video image.

Thus, there exists a need for producing digital videos with reduced motion blur or increased brightness, by using conventional electronic image sensors.

SUMMARY OF THE INVENTION

It is an object of the present invention to produce digital video images with reduced motion blur or increased brightness that overcome one or more of the problems set forth above. Briefly summarized, according to one aspect of the present invention, the invention provides a method of providing a digital video of a scene with reduced motion blur or increased brightness, using a digital image processor to provide the following steps, comprising:

a. determining for a digital video capture an exposure time for each digital video image based on brightness measurements of the scene;

b. capturing each digital video image with a reduced exposure time that is 1/n of the determined exposure time for said digital video image, where n is greater than 1;

c. selecting a first series of at least b sequential images within the digital video capture, where b is greater than 1;

d. combining pixel values of the selected first series of sequential images to produce a first intermediate image that is brighter than each of the selected sequential images;

e. assigning one of the selected sequential images as a reference image, and processing said reference image to create a second intermediate image which is brighter than the reference image and which has less motion blur than the first intermediate image;

f. identifying moving regions among the selected sequential images;

g. replacing the pixel values of the moving regions in the first intermediate image with pixel values from corresponding regions from the second intermediate image to thereby produce a first digital video image having reduced motion blur or increased brightness;

h. repeating steps c through g for a second series of sequential images that includes at least one image from the first series of sequential images to produce a second digital video image having reduced motion blur or increased brightness; and i. storing or transmitting the video including the first and second digital video images with reduced motion blur or increased brightness.

An advantage of the present invention is that digital video images with improved quality such as reduced object motion blur, reduced noise or increased brightness can be produced with basic changes to the image processing software.

A further advantage of the present invention is that digital video images with reduced image capture device-induced blur can be produced without the need for costly special lenses with laterally moveable lens elements.

This and other aspects, objects, features, and advantages of the present invention will be more clearly understood and appreciated from a review of the following detailed description of the preferred embodiments and appended claims, and by reference to the accompanying drawings.

DETAILED DESCRIPTION OF THE INVENTION

A digital image includes one or more digital image channels. Each digital image channel includes a two-dimensional array of pixels. Each pixel value relates to the amount of light received by an electronic image sensor corresponding to the geometrical domain of the pixel. For color imaging applications, a digital image will typically consist of red, green, and blue digital image channels. Other configurations, such as using cyan, magenta, and yellow image channels, are also practiced. For monochrome applications, the digital image consists of one digital image channel. Some additional configurations include panchromatic image channels along with color image channels. Those skilled in the art will recognize that the present invention can be applied to, but is not limited to, a digital image for any of the above-mentioned applications.

In the following, the term digital video image is used to refer to an image from a digital video capture, which can contain a plurality of sequentially captured digital video images. The term digital video image is also used to refer to a digital image derived from one or more digital video images.

In the following, object motion blur refers to blur in an image resulting from the motion of an object in the scene occurring during capture. Camera motion blur refers to blur in an image resulting from motion of the capture device during capture. The general term motion blur can refer to object motion blur or camera motion blur.

Although the present invention describes a digital image channel as a two-dimensional array of pixel values arranged by rows and columns, those skilled in the art will recognize that the present invention can be applied to mosaic (non-rectilinear) arrays with equal effect. Those skilled in the art will also recognize that, although the present invention describes replacing an original pixel value with processed pixel values to form a new digital video image with the processed pixel values, retaining the original pixel values is also contemplated.

Imaging devices employing electronic image sensors are well known in the art. Therefore, the present description will be directed, in particular, to elements forming part of, or cooperating more directly with, a method in accordance with the present invention. Elements not specifically shown or described herein are selected from those known in the art. Note that as used herein, the term image is a two-dimensional array of pixel values. An image can be a two-dimensional subset of another image. Given the invention as described in the following materials, software not specifically shown, described, or suggested herein, that is useful for implementation of the invention, is conventional and within the ordinary skill in such arts.

Figure 1:
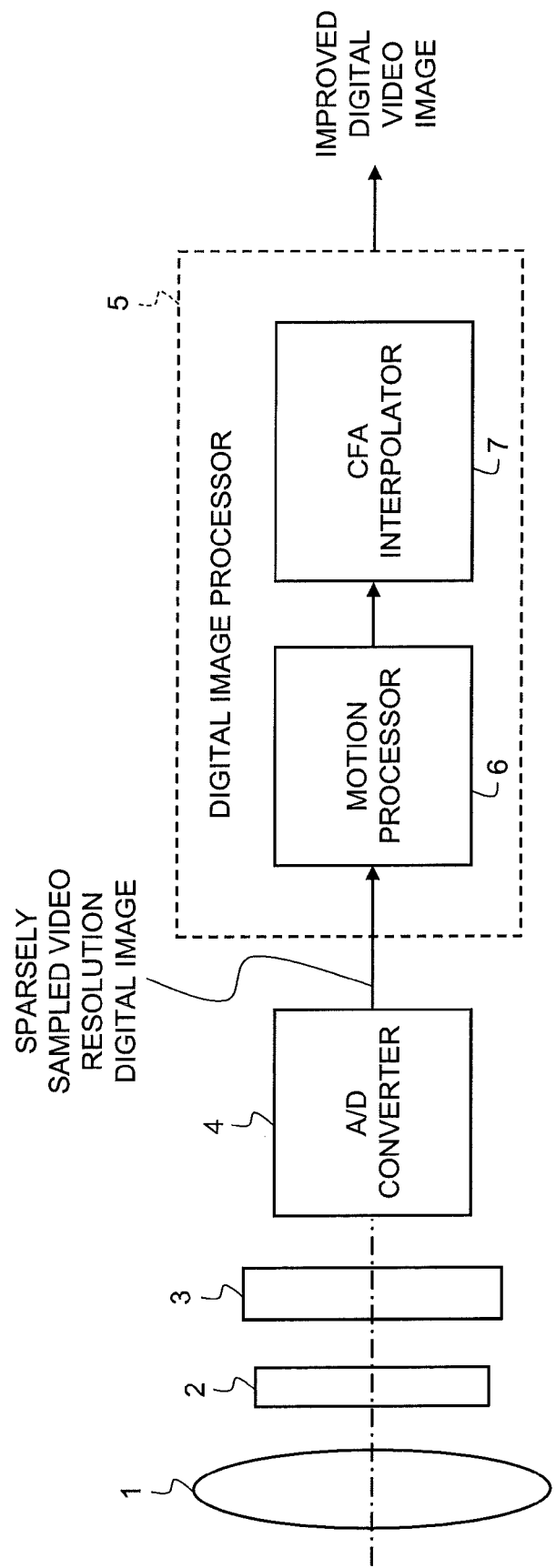
FIG. 1 is a block diagram of a digital still and video camera system that employs a conventional sensor and uses the processing methods of the present invention.
Figure 3:
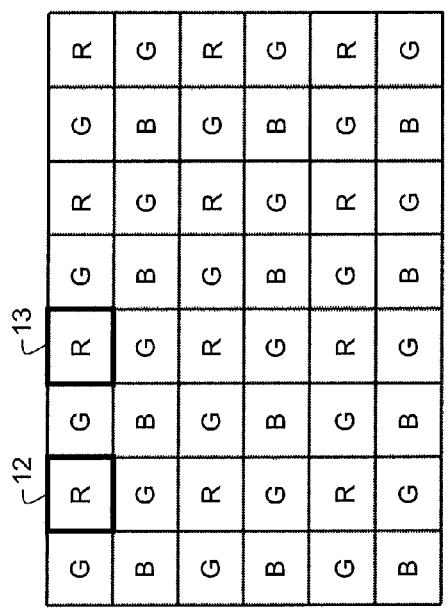
FIG. 3 is a diagram of a Bayer color filter array.

The essential elements employed in the practice of the present invention are shown as a functional block diagram in FIG. 1. Light from an object or scene is incident upon a lens 1 forming a photographic image on an electronic image sensor 3 such as a charged-coupled device (CCD) with a color filter array (CFA). Note that other devices, such as complimentary metal oxide semiconductor (CMOS) devices, can be used as the electronic image sensor 3. An optical low pass filter 2, placed between the lens 1 and the electronic image sensor 3, performs a slight blurring of the imaged light in order to reduce the occurrence of aliasing. Each photosite of the electronic image sensor 3 is typically provided with either a red, green, or blue filter, as described by Bayer in commonly assigned U.S. Pat. No. 3,971,065 issued Jul. 20, 1976. The Bayer array is a color filter array in which green filters are located in a checkerboard pattern over the photosites with red and blue filters alternating line by line to fill the interstices of the checkerboard pattern. The array has twice as many green filter sites as either red or blue filter sites, as shown in FIG. 3. The method described herein can be easily extended to color filter arrays with different arrangements of the color filters, a different number of color filters, or a different set of color filters.

The amount of time that the light is gathered by the electronic image sensor 3 is typically predetermined by an automatic exposure control. The automatic exposure control can be selected from those known in the art, an example of which is disclosed in U.S. Pat. No. 5,335,041 by Fox, issued Aug. 2, 1994. Based on brightness measurements of a scene to be imaged, the electronic imaging system typically employs automatic exposure control processing to determine an effective exposure time, $t_e$, that will yield an image with effective brightness. For digital video capture, the maximum exposure for a given image, $t_m$, is constrained by the frame rate of the video capture. For example, for a video captured at 30 frames per second, the maximum allowable exposure for a given image in the video is ⅟30 second. In low-light scenarios, it can be the case that the effective exposure time is greater than the maximum allowable exposure for a given video image, and the resulting video capture is dark or else noisy if a gain factor is applied to the pixel values to increase the brightness. In the present invention, the exposure time determined by the automatic exposure control, $t_e$, is modified by dividing it by some number n. The reduced exposure time can be $t'=t_e/n$, where n is greater than one. For cases in which $t_e > t_m$, it is necessary to select n large enough to ensure that $t' <= t_m$. One skilled in the art will recognize that the greater the number n, the more object motion blur is reduced in each image. At least first $i_1(x,y)$ and second $i_2(x,y)$ digital video images, where (x,y) specifies the indices of the pixel location with reference to the electronic image sensor, can be captured. Each digital video image can be captured with a reduced exposure time t', forming a sequence of images wherein t' is less than $t_e$. If the sequence of images contains at least n images, the cumulative exposure time for the sequence of images represents an exposure time that is at least equal to an overall effective exposure $t_e$. Those skilled in the art will recognize that it is not necessary to employ the same modified exposure time t' in capturing each image in the sequence and that the sequence can contain fewer than n images at the expense of increased image noise. For example, the modified exposure time t' that is employed can be one quarter of $t_e$ and the captured sequence can contain two images.

An A/D converter 4 receives, in series for each captured image in the digital video, the voltage signal corresponding to the imaged light from the photosites on the electronic imager sensor 3 and produces an image signal corresponding to the voltage signal that is a sparsely sampled video resolution digital image. Note that in many digital image and video capture devices, the image sensor has higher resolution than is required for a digital video image. Image sensor output at video resolution can be achieved by many methods known to those skilled in the art, such as binning of charges or discarding of data to reduce the resolution of the image sensor output. Since the electronic image sensor 3 has multiple types of photosites (e.g. red, green, or blue) but produces only a single value at each pixel location, a digital video image, as captured, is a sparsely sampled digital image with respect to color. The pixel values of the digital video image output from the A/D converter 4 constitute a sparsely sampled digital image having red, green, and blue pixel values at neighboring pixel locations. It is desirable to produce a pixel value corresponding to an exposure for each of the red, green, and blue exposures at each photosite location. The digital image processor 5 receives, in series for each captured image in the digital video, the sparsely sampled video resolution digital images from the A/D converter 4, modifies the image signals and produces a full color video resolution digital image with red, green, and blue values for all pixel locations. The digital image processor 5 can be a programmed personal computer, a microprocessor or a digital image processor. The present invention can be practiced with any image capture device such as a digital camera, a mobile phone, a film or reflection scanner, or any other device that produces a digital image.

In a first embodiment of the invention, it is assumed that the image and video capture device does not move during the capture of the digital video. The digital image processor 5 shown in FIG. 1 contains two sub-components: the motion processor 6 and the CFA interpolator 7. The image signals of the captured digital video are received from the A/D converter 4 by the motion processor 6. The motion processor 6 processes the sparsely sampled video resolution digital video image outputs from the A/D converter 4 to create a new digital video image with reduced object motion blur or increased brightness. Consider an example in which a first digital video image $i_1(x,y)$ and a second digital video image $i_2(x,y)$ are captured. Digital image processor 5 combines pixels of the first digital video image (x,y) to produce a second intermediate image c(x,y) which is brighter than the first $i_1(x,y)$ and second $i_2(x,y)$ digital video images and has a lower resolution than either the first $i_1(x,y)$ or second $i_2(x,y)$ digital video images.

An object motion detector 10 (see FIG. 2A) identifies static and moving regions between the first and second digital video images to produce a motion map p(x,y).

A first intermediate image m(x,y) with object motion blur is produced by the digital image processor 5. The digital image processor 5 sums the first $i_1(x,y)$ and second $i_2(x,y)$ digital video images from the captured digital video to produce the first intermediate image m(x,y) that is brighter than either the first or second digital video image but object motion blur is present in the moving regions.

Next, the motion map p(x,y) as produced by the object motion detector 10 is used to identify the regions in the first intermediate image m(x,y) that are replaced with corresponding regions from the second intermediate image c(x,y) to thereby produce a digital video image d(x,y) having reduced motion blur or increased brightness. Since the moving regions are replaced by corresponding regions from the second intermediate image which is based on only one captured digital video image, the effects of object motion between multiple image captures is reduced. As a result, the digital video image d(x,y) has improved image quality derived from reduced object motion blur or increased brightness.

More specifically, the digital video image d(x,y) as output from the motion processor 6 is a digital video image that is a sparsely sampled digital video image with reduced object motion blur or increased brightness, and areas of both full resolution and lower resolution. The motion processor 6 then transmits the digital video image d(x,y) to the CFA interpolator 7 where the color values are interpolated to provide red, green and blue color values at each pixel. The purpose of the CFA interpolator 7 is to generate a full description of the color for each pixel location of the sensed photographic image. Any commonly known CFA interpolator can be used, and a description of one CFA interpolator is disclosed in U.S. Pat. No. 5,652,621 issued Jul. 29, 1997 to Adams et al. Although the proposed invention is described having a digital image processor 5 in which the motion processor 6 operates on sparsely sampled images, and a CFA interpolator 7 operating on the output of the motion processor 6, it is within the scope of this invention to reverse the order of these two operations such that the motion processor 6 operates on full color images output from the CFA interpolator 7.

Figure 2A:
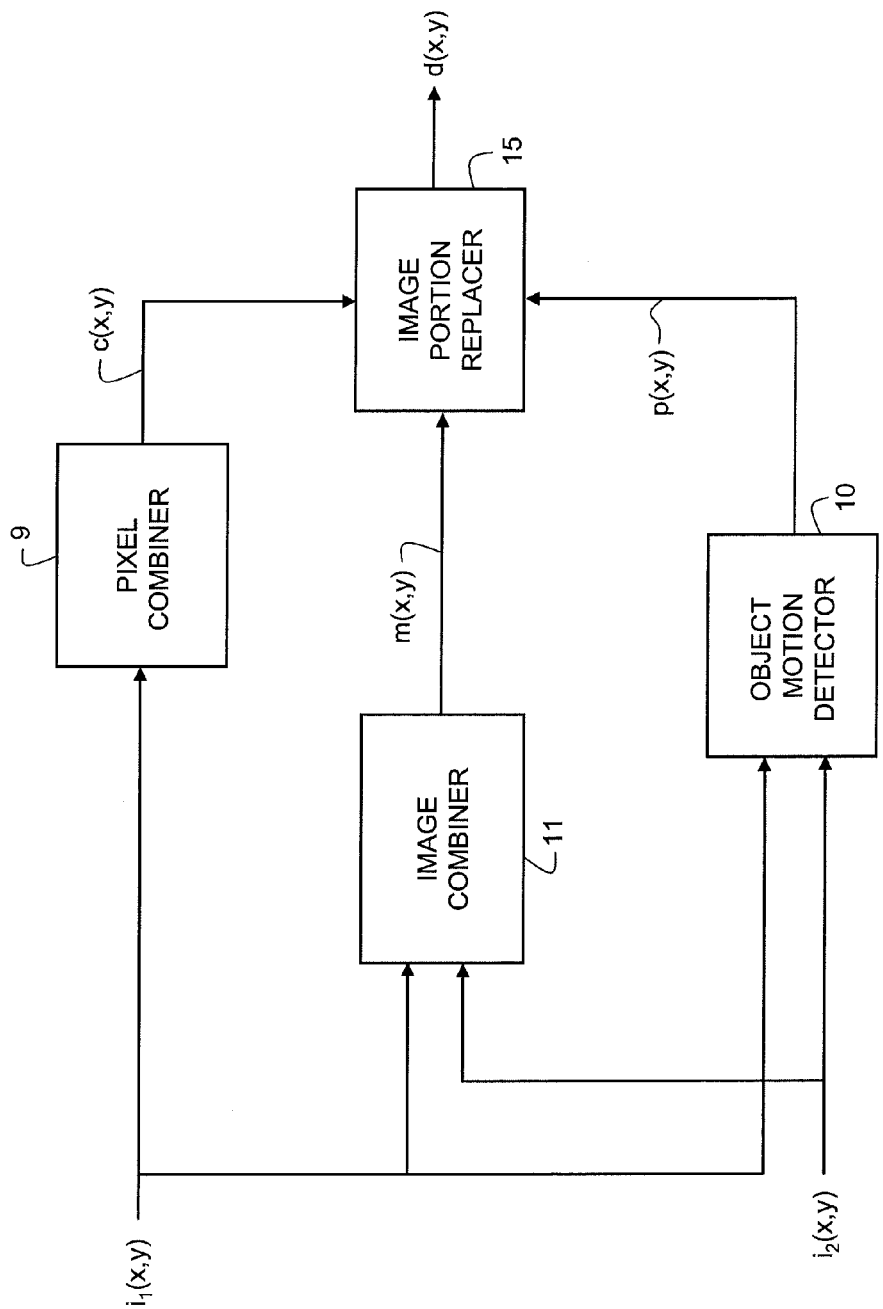
FIG. 2A is a block diagram which illustrates the present invention when only objects are moving in the scene.
Figure 2B:
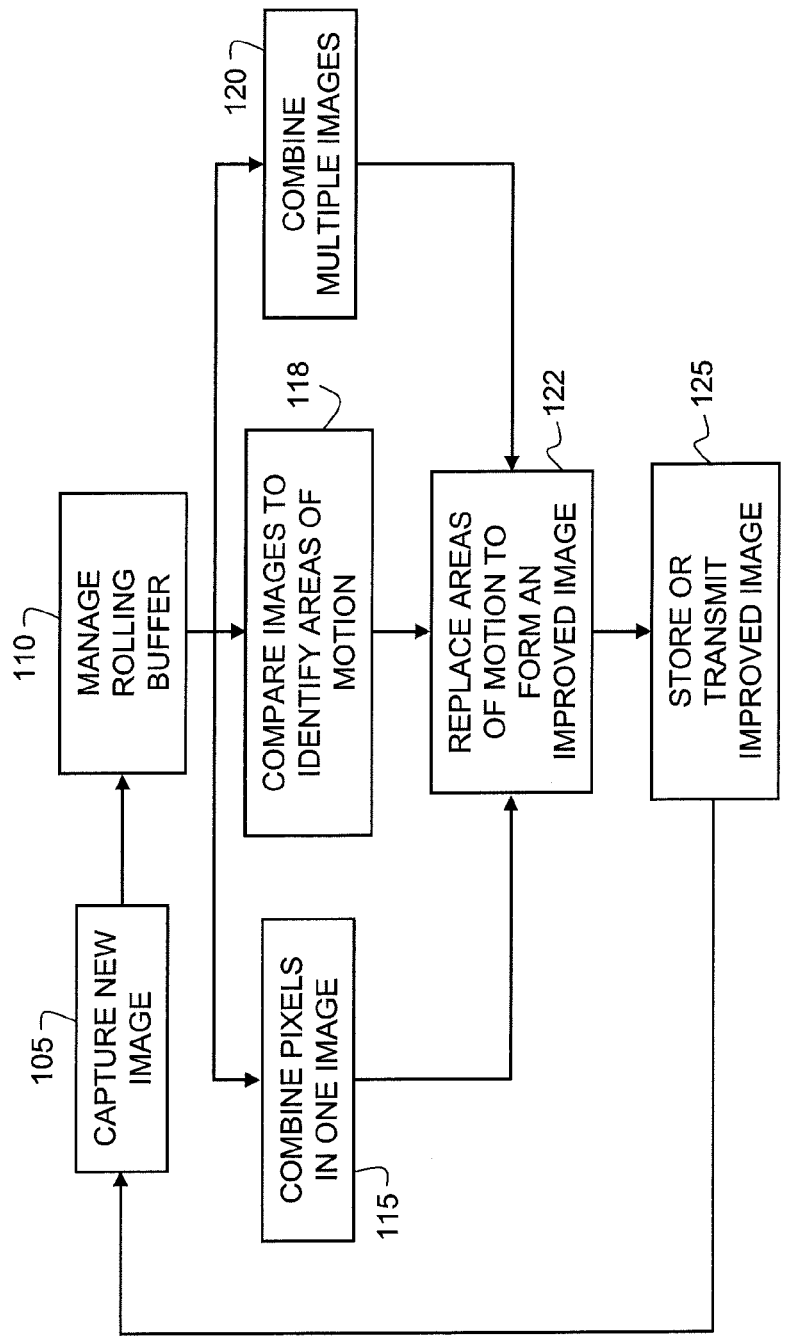
FIG. 2B is a flow chart of an embodiment of the invention for a continuous capture of digital video images when only objects in the scene are in motion.

A flow chart showing the process for forming improved digital video images on a continuous basis is shown in FIG. 2B. In Step 105, a new digital video image is captured. This process includes firstly determining an exposure time for the digital video image based on brightness measurements of the scene, and secondly capturing the digital video image with a reduced exposure time of 1/n the determined exposure time, where n is greater than 1. The new digital video image is put into a rolling buffer in Step 110 and the rolling buffer is managed to contain a plurality of the most recently captured images (e.g. first digital video image $i_1(x,y)$ and a second digital video image $i_2(x,y)$). From this rolling buffer, a first series of at least b sequential images is selected, where b is greater than 1. Note that while sequential images often refer to consecutive images in the video capture, this is not a requirement, and the selected sequential images can be any plurality of images contained in the rolling buffer. The first series of sequential images are combined in step 120 to form a first intermediate image m(x,y) that is brighter than each of the selected sequential images. The first intermediate image is also blurry in areas with motion. In Step 115, one of the selected sequential images is assigned as a reference image, and the pixels of this reference image are combined to produce a second intermediate image c(x,y) which is brighter than the reference image and which has less motion blur than the first intermediate image. The second intermediate image also has lower resolution than the reference image. In Step 118, the object motion detector 10 (FIG. 2A) compares sequential images to identify areas of motion in the scene and produce a motion map p(x,y). In Step 122, the image portion replacer 15 (FIG. 2A) replaces areas in the first intermediate image m(x,y) that have been identified to have motion present as shown in the motion map p(x,y), with corresponding regions from the second intermediate image c(x,y) to thereby produce a first improved digital video image $d_1(x,y)$ which has reduced object motion blur or increased brightness. The improved digital video image $d_1(x,y)$ is then stored or transmitted in Step 125. The process repeats at least a second time for a second series of sequential images, wherein the rolling buffer contains at least one image from the first series of sequential images, and wherein a second improved digital video image $d_2(x,y)$ is produced having reduced motion blur or increased brightness, and wherein the improved digital video image $d_2(x,y)$ is also stored or transmitted. While the above description relates to the production of two improved digital video images having reduced motion blur or increased brightness, the description can easily be extended to include additional video images. The digital video images having reduced motion blur or increased brightness can be stored or transmitted, and can be displayed to a user.

The operation of the motion processor 6 is more fully explained with reference to FIG. 2A. The sparsely sampled video resolution digital image outputs from the A/D converter 4 are received by the motion processor 6 which produces the aforementioned improved digital video image d(x,y) with reduced object motion blur or increased brightness. FIG. 2A represents the motion processor in the first preferred embodiment of the present invention in which for example, two sparsely sampled digital video images $i_1(x,y)$ and $i_2(x,y)$ are captured in sequence by the electronic image sensor 3. The two sparsely sampled digital video images $i_1(x,y)$ and $i_2(x,y)$ are transmitted after each capture from the A/D converter 4 to the digital image processor 5. In this first preferred embodiment, the motion processor 6 includes a pixel combiner 9, an object motion detector 10, an image combiner 11, and an image portion replacer 15. In the pixel combiner 9, each pixel in $i_1(x,y)$ is assigned to a pixel sub-array. A pixel sub-array is defined as an array of pixels that are all of the same type and are located close together. The pixel sub-array that is shown in the Bayer array of FIG. 3 is one row high and two columns wide and is composed of red pixels 12 and 13. Although the present invention describes a pixel combiner 9 that uses pixel sub-arrays that are one row high and two columns wide and contains two pixels of the same type, those skilled in the art will recognize that the present invention can be applied using pixel sub-arrays of other dimensions or that contain a different number of pixels, or that contain pixels of different types with equal effect. Each pixel in the image belongs to only one pixel sub-array, so the image represented in FIG. 3 has six red sub-arrays, six blue sub-arrays and twelve green sub-arrays. In the pixel combiner 9, once all the pixels in the image $i_1(x,y)$ have been assigned to a sub-array, all the pixels in each sub-array are summed together and the pixels in each sub-array are replaced by the resulting sum value of each sub-array. So, for example, the values of pixels 12 and 13 in FIG. 3 would each be replaced by the sum of the values of pixels 12 and 13. Since the values of all the pixels in a sub-array are replaced by the same single sum value, the image that results after processing all the sub-arrays of image $i_1(x,y)$ as described above is a low-resolution image that has the same number and type of pixels as $i_1(x,y)$. Therefore, the output of the pixel combiner 9 is a second intermediate image c(x,y) which is a low resolution sparsely sampled digital video image. Since the values of all the pixels in a sub-array are replaced by the same single sum value, the second intermediate image c(x,y) has a higher signal (i.e. it is brighter) and greater signal-to-noise ratio than the first digital video image $i_1(x,y)$. Because of the pixel-combining step, the second intermediate image c(x,y) has increased brightness at the expense of reduced resolution.

As contemplated in the invention, the number of pixels, q, that are combined in the sub-array would be similar to the number of digital video images, b, being combined from the digital video capture. In this preferred embodiment example there are two pixels in each sub-array (q=2) because there are two images (b=2) being combined by the image combiner 11 from the digital video capture: a first digital video image $i_1(x,y)$ and a second digital video image $i_2(x,y)$. This ensures that the second intermediate image c(x,y) has the same brightness as the sum of the images in the captured sequence as produced in the first intermediate image m(x,y). Alternatively, one can combine more or fewer pixels within a sub-array than there are digital video images being combined if the pixel values in the second intermediate image c(x,y) are multiplied by a constant k, where k is equal to the number of digital video images being combined divided by the number of pixels in a sub-array k=b/q. Those skilled in the art will recognize that if k is more than one, then the second intermediate image c(x,y) will be noisier and have more resolution than if k is less than one. It is therefore advantageous to use a k that is equal to or less than one.

Those skilled in the art will recognize further ways to combine pixel values to form the second intermediate image c(x,y), some of the further ways can also be used to combine pixel values from the b images to form the first intermediate image m(x,y). The charge from same colored pixels can be combined or binned on the image sensor as is well known in the image sensor art. Combining or binning charge on the image sensor from two pixels doubles the signal level, while the standard deviation of the photon shot noise associated with the combined pixel charge increases by only the square root of 2, and the noise associated with sampling and reading out the combined signal remains the same. Thus the signal to noise ratio increases by approximately a factor of square root of two, representing a corresponding two times increase in the photosensitivity of the combined pixels. In this binned embodiment of the invention for producing the second intermediate image, the image sensor is operated in a binned mode wherein pixels are electrically connected to each other during capture, for example adjacent pixels of the same color can be connected together in pairs. A separate image capture is required to provide the second intermediate image with the image sensor in a binned capture mode. In another approach, the voltages corresponding to the measured amounts of charge in same colored pixels can be averaged by first charging capacitors to the voltages produced by the pixels and then connecting the capacitors together to average the voltages, with the capacitors being of equal sizes to perform a simple average or of differing sizes to perform a weighted average. In yet another approach, the pixel values can be converted to digital numbers and the digital numbers can then be combined. Alternatively, the digital representations of the light levels at same colored pixels can be summed or averaged. Those skilled in the art will also recognize that other forms of spatial filters can be used other than summing to increase the brightness of the second intermediate image c(x,y) wherein the weighting factors between pixels are nonuniform.

Both the first digital video image $i_1(x,y)$ and the second digital video image $i_2(x,y)$ are transmitted to the object motion detector 10 to produce a motion map, p(x,y). The object motion detector 10 identifies static and moving regions between the first digital video image $i_1(x,y)$ and the second digital video image $i_2(x,y)$ and stores the identifying information in the motion map p(x,y). Those skilled in the art will recognize that the motion detector can be implemented in many ways within the spirit of the invention. The implementation in this preferred embodiment uses pixel-block difference thresholds. The first digital video image $i_1(x,y)$ and the second digital video image $i_2(x,y)$ are partitioned into blocks of pixels, similar to but not necessarily the same as the sub-array partitioning that is used within the pixel combiner 9 and described above. The size of sub-arrays will usually be smaller than the size of blocks so as to not give up too much resolution in the final image and, conversely, the size of blocks will be greater than the size of sub-arrays to make the motion detection more robust. The blocks of pixels in this preferred embodiment are 32 rows high and 32 rows wide and each block contains pixels of the same type, but those skilled in the art will recognize that other pixel blocks sizes, shapes, and compositions are also possible. The pixel values in each block of the first digital video image $i_1(x,y)$ are averaged and the average is subtracted from the average of the corresponding block in the second digital video image $i_2(x,y)$. If the absolute value of a block difference is greater than some pre-determined threshold T, then it is determined that there is object motion in that block between the first digital video image $i_1(x,y)$ and the second digital video image $i_2(x,y)$. The threshold T can be chosen separately for each block in the first digital video image $i_1(x,y)$, and in this preferred embodiment T depends on the expected magnitude of the image noise given the average value of a block in the first digital video image $i_1(x,y)$. As mentioned above, if a block difference is greater than T, then it is determined that there is object motion in that block between the first digital video image $i_1(x,y)$ and the second digital video image $i_2(x,y)$. In that case, the motion map p(x,y) is given a value of one for all pixel locations within that block. If no motion is found for a block, then the motion map p(x,y) is given a value of zero for all pixel locations within that block. Therefore, in this preferred embodiment p(x,y) is a binary motion map. Those skilled in the art will recognize that the motion map p(x,y) can take on other functional forms such as, for example, a fuzzy logic map or a probabilistic determination map.

A first intermediate image m(x,y) is formed within the image combiner 11 by summing the pixel values of the first digital video image $i_1(x,y)$ and the second digital video image $i_2(x,y)$ (when b=2) to produce a brighter image which contains object motion blur.

The motion map p(x,y) is transmitted to the image portion replacer 15 along with the second intermediate image c(x,y) and the first intermediate image m(x,y). The image portion replacer 15 applies a combining function, using the motion map p(x,y), along with the first intermediate image m(x,y) and the second intermediate image c(x,y) to produce an improved digital video image d(x,y) with reduced object motion blur or increased brightness. The combining function is such that the value of a pixel in d(x, y) is equal to the value of the corresponding pixel in the first intermediate image m(x,y) if no motion (p(x,y)=0) is indicated in the corresponding location of the motion map p(x,y). Moreover, the combining function is such that the value of a pixel in the improved digital video image d(x,y) is equal to the value of a pixel in the second intermediate image c(x,y) if motion is indicated (p(x,y)=1) in the corresponding location of the motion map p(x,y). In this preferred embodiment of the invention, where the digital video capture contains two digital video images and the motion map is binary, the resulting image d(x,y) is calculated as follows:

$$d(x,y)=p(x,y)c(x,y)+[1-p(x,y)][m(x,y)]. \quad (1)$$

The improved digital video image d(x,y) is an image with reduced object motion blur if the modified exposure time t' that is used to capture the plurality of digital video images in the digital video capture is less than the exposure time $t_e$. The image d(x,y) has increased brightness if the effective exposure time for the first intermediate image m(x,y) is at least nt' and the effective exposure time for the second intermediate image c(x,y) is also at least nt'. The image d(x,y) also has increased brightness if the effective exposure time for the first and second intermediate images is greater than $t_m$, the maximum exposure time for a single video image. The image d(x,y) has the same amount of noise throughout its locations if the number of pixels in the sub-arrays used in the pixel combiner 9 is the same as the number of images combined from the digital video capture.

The improved digital video image d(x,y) is transmitted to the CFA interpolator 7 as shown in FIG. 1 to produce a digital video image r(x,y) which has a full description of the color for each pixel location of the sensed photographic image.

Figure 4A:
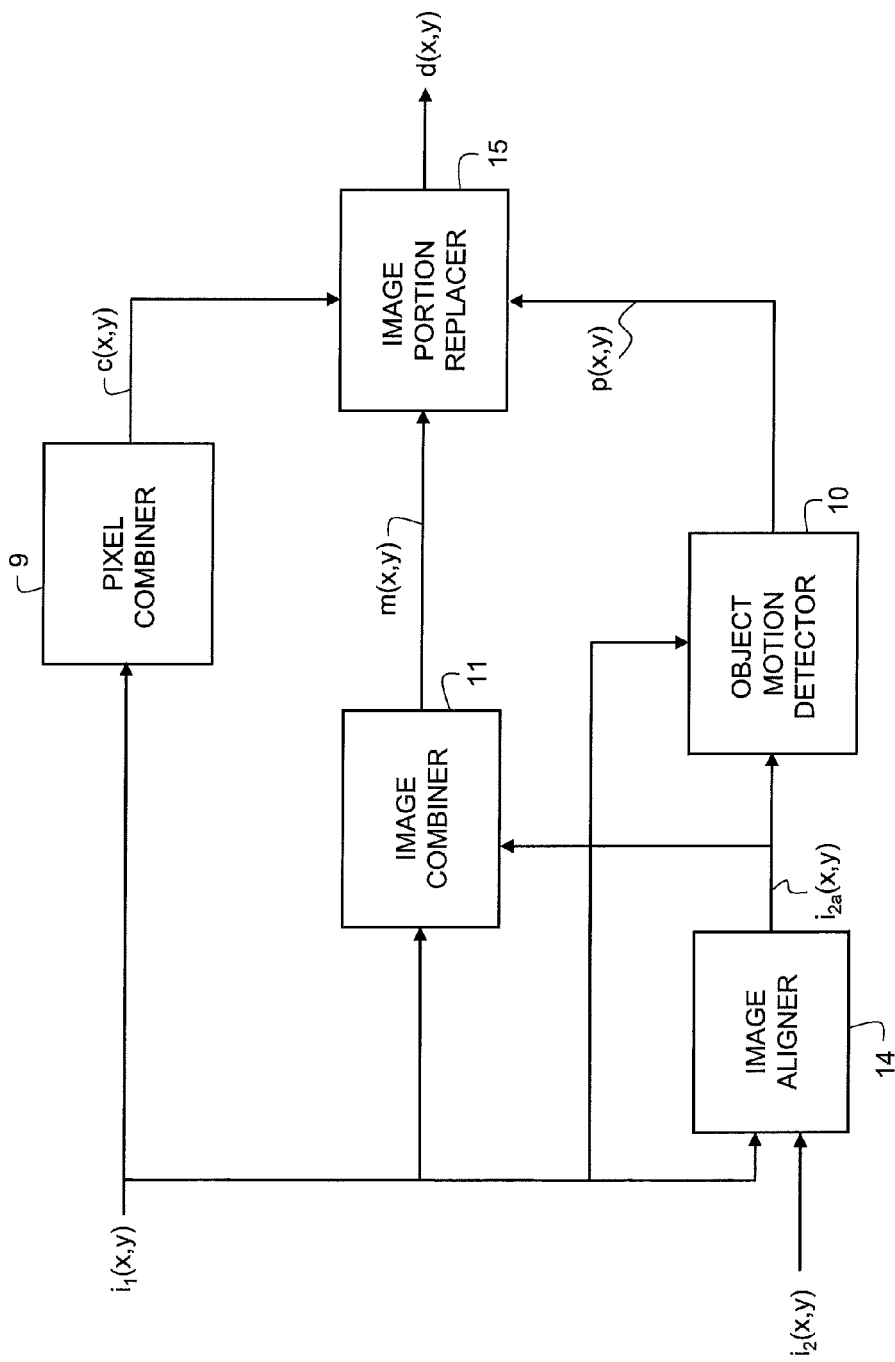
FIG. 4A is a block diagram which illustrates the present invention when both the objects in the scene and the image capture device are in motion.

In another embodiment of the invention shown in FIG. 4A the image capture device moves during the digital video capture, causing image capture device induced blur in the digital video images. In this case the digital video images must be aligned with each other prior to being combined to compensate for the image capture device motion among the plurality of digital video images that are combined to form the improved digital video image. FIG. 4A shows the added step of an image aligner 14 to align the images to one another.

Figure 4B:
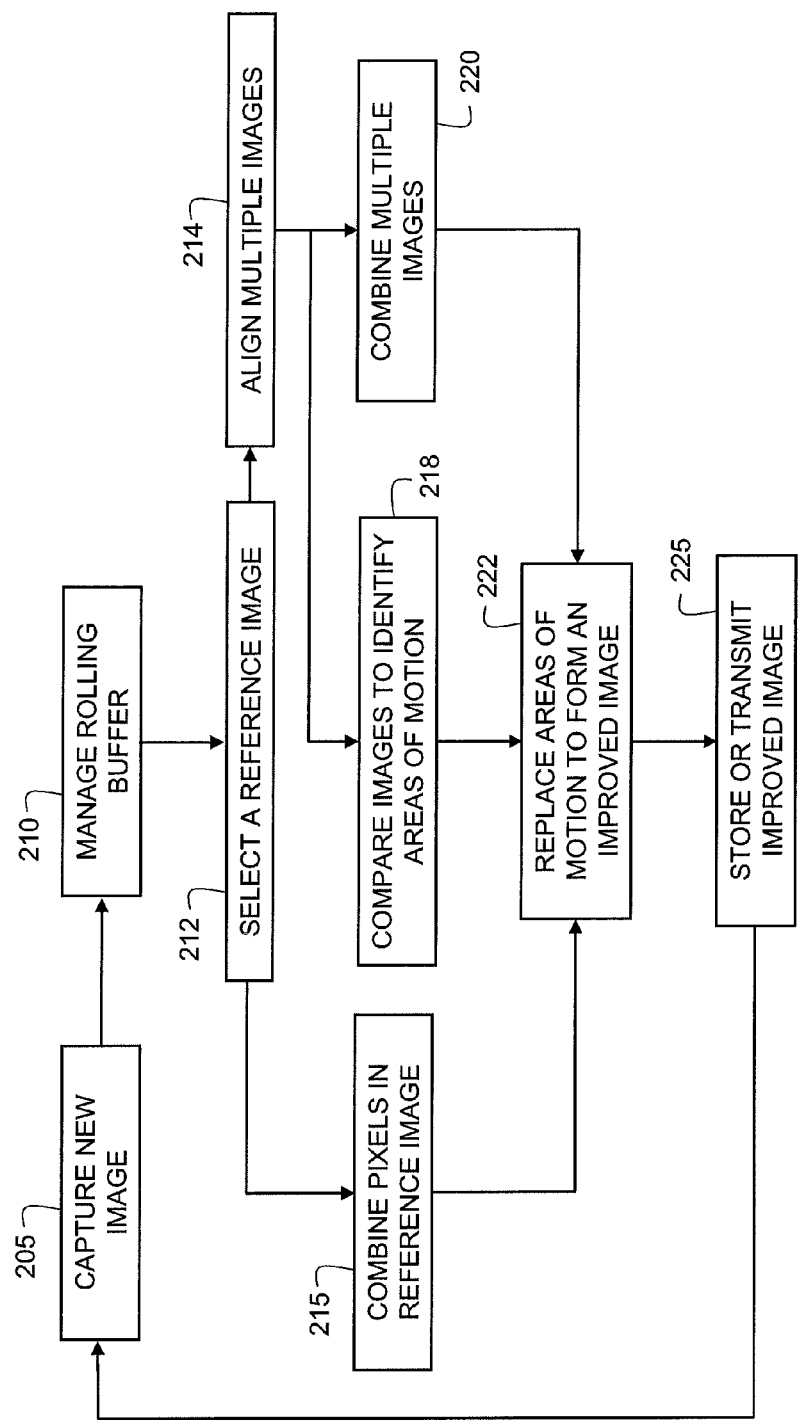
FIG. 4B is a flow chart of an embodiment of the invention for a continuous capture of digital video images when both the objects in the scene and the image capture device are in motion.

FIG. 4B shows a flow chart for the process of producing improved digital video images continuously including steps for alignment of the digital video images. In Step 205, a new digital video image is captured. This process includes firstly determining an exposure time for the image based on brightness measurements of the scene, and secondly capturing the digital video image with a reduced exposure time of 1/n the determined exposure time, where n is greater than 1. The new digital video image is put into a rolling buffer in Step 210 and the rolling buffer is managed to contain a plurality of the most recently captured digital video images (e.g. first digital video image $i_1(x,y)$ and a second digital video image $i_2(x,y)$). From this rolling buffer, a first series of at least b sequential digital video images is selected, where b is greater than 1. In Step 212 a reference image is selected (shown in FIG. 4A as $i_1(x,y)$) wherein the reference image is typically the first or last digital video image in the rolling buffer. In Step 214, the first series of sequential digital video images (shown in FIG. 4A as $i_1(x,y)$ and $i_2(x,y)$) are aligned with the reference image by the image aligner 14 to compensate for the motion of the image capture device. The aligned digital video images (shown in FIG. 4A as $i_1(x,y)$ and $i_{2a}(x,y)$) are combined in Step 220 to form a first intermediate image m(x,y) that is brighter than each of the selected sequential images. The first intermediate image is also blurry in areas with motion. In Step 215, the pixel sub arrays of the reference image are combined as described previously to produce a second intermediate image c(x,y) which is brighter than the reference image and which has less motion blur than the first intermediate image. The second intermediate image also has lower resolution than the reference image. In Step 218, the object motion detector 10 compares sequential images to identify areas of motion in the scene and produce a motion map p(x,y). In Step 222, the image portion replacer 15 replaces areas in the first intermediate image m(x,y) that have been identified to have motion present as shown in the motion map p(x,y), with corresponding regions from the second intermediate image c(x,y) to thereby produce a first improved digital video image $d_1(x,y)$ which has reduced motion blur or increased brightness. The improved digital video image $d_1(x,y)$ is then stored or transmitted in Step 225. The process repeats at least a second time for a second series of sequential images, wherein the rolling buffer contains at least one image from the first series of sequential images, and wherein a second improved digital video image $d_2(x,y)$ is produced having reduced motion blur or increased brightness, and wherein the improved digital video image $d_2(x,y)$ is also stored or transmitted. While the above description relates to the production of two improved digital video images having reduced motion blur or increased brightness, the description can easily be extended to include additional video images. The digital video images having reduced motion blur or increased brightness can be stored or transmitted, and can be displayed to a user.

The process of image alignment in the image aligner 14 is accomplished by comparing pixel values between a reference image, $i_R(x,y)$, and a comparison image, $i_K(x,y)$, to identify the pixel shift $s_K(x,y)$ between the reference image $i_R(x,y)$ and the comparison image, $i_K(x,y)$ caused by image capture device motion. Such algorithms are well-known to those skilled in the art. This alignment is repeated between the reference image, $i_R(x,y)$, and all other images, $i_K(x,y)$, for K=1, 2, . . . , b, K≠R. The pixel values of the comparison images, $i_K(x,y)$, are then shifted in location within the image by $s_K(x,y)$ to produce aligned images $i_{Ka}(x,y)$ which are compensated for the image capture device motion. The aligned images are then processed by the image combiner 11 and the object motion detector 10 as shown in FIG. 4A. The example in FIG. 4A shows the case where 2 images are combined and the reference image is $i_1(x,y)$, but those skilled in the art will recognize that the process of image alignment as described could be applied to any number of digital video images captured in a sequence so long as there are common areas with the reference image $i_R(x,y)$. Those skilled in the art will also recognize that in a preferred embodiment, the comparing of pixel values between the images can be done on compressed versions of the images to determine (x,y), with a reduced amount of data so that image processing speed can be increased. Those skilled in the art will also recognize that the embodiment shown in FIG. 4A compensates for motion of the image capture device thereby providing a stabilizing influence during image capture without the need for a gyroscopic device to sense motion of the image capture device or a special lens with a laterally moveable lens element to compensate for motion of the image capture device. Although, it will be recognized that using a gyroscopic device to measure motion of the image capture device and at least partially aligning the b images based on the measured motion of the image capture device falls within the scope of the present invention.

Figure 5:
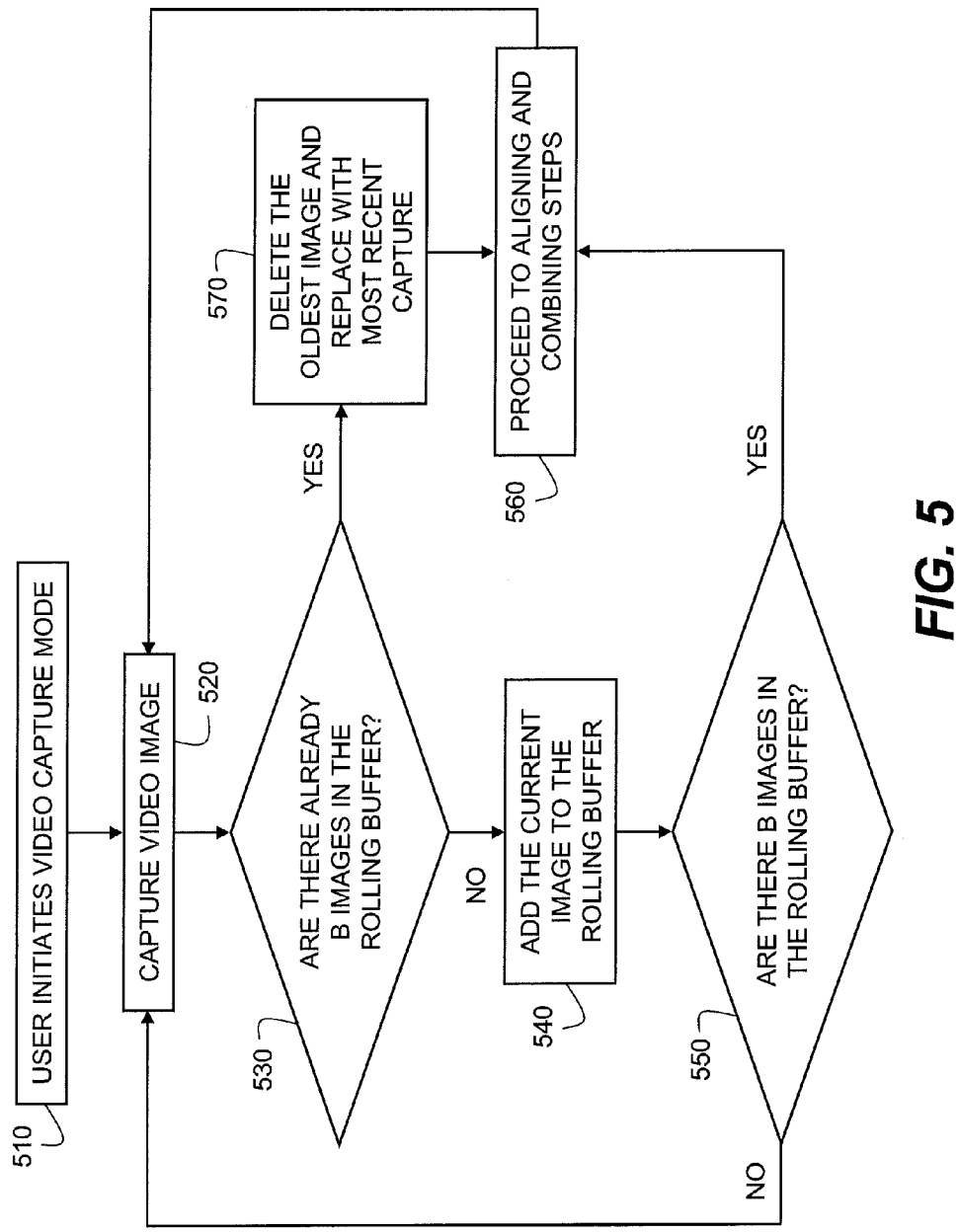
FIG. 5 is a flow diagram which illustrates a method for applying the current invention to an entire video capture.

Whereas FIG. 2A and FIG. 4A illustrate how the proposed invention can be applied to a sequence of digital video images to improve the image quality of a digital video image, FIG. 5 illustrates how this process can be repeated continuously by using a rolling buffer to improve each digital video image contained in the digital video capture.

In step 510, the user initiates video capture mode. In step 520, a digital video image is captured. In step 530, the rolling buffer is accessed to see if there are already b digital video images stored in the rolling buffer. The rolling buffer is memory allocated to the temporary storage of digital video images. It is rolling in the sense that once the buffer is full, when a new digital video image is added to the buffer, the oldest digital video image in the buffer is removed from the buffer. If the answer to this question is "no", the current digital video image is added to the rolling buffer in step 540. After the current digital video image is added to the rolling buffer, the number of digital video images stored in the rolling buffer is again queried in step 550. If the answer to this question is "no", and there are still fewer than b images stored in the rolling buffer, control is reverted to step 520, awaiting the next digital video image capture. If the current digital video image brings the rolling buffer to storage of b images such that the response to step 550 is "yes", then in step 560 the b images in the rolling buffer are processed by the aligning and combining steps to produce an improved digital video image having reduced motion blur or increased brightness. Subsequently, control is reverted to step 520, awaiting the next digital video image capture. Returning to step 530, if there are already n images in the rolling buffer without considering the current digital video image (a "yes" response at step 530), then in step 570 the temporally oldest of these images is deleted from the rolling buffer and replaced with the current digital video image. The process of adding a new digital video image and removing the oldest digital video image can be accomplished by overwriting the memory corresponding to the oldest image with the new digital video image. Afterwards, the b images in the rolling buffer are processed by the aligning and combining steps to produce an improved digital video image having reduced motion blur or increased brightness in step 560. Finally, control is reverted to step 520, awaiting the next digital video image capture.

The processing path described in FIG. 5 results in an improved digital video containing fewer total digital video images than initially captured. In particular, if M digital video images are captured, the improved digital video contains M−b+1 digital video images. This results from the need to buffer b digital video images before producing an improved digital video image. Those skilled in the art will recognize that there are many ways to produce an improved digital video containing the same number of images, M, as initially captured. Some digital video images from the beginning or end of the capture can be appended as initially captured. Alternatively, until the rolling buffer fills, an improved digital video image can be formed using as many digital video images as are available.

The elements of the proposed invention applied to a digital video capture are further explained in the following paragraphs and accompanying figures. The following notation is used to represent various characteristics of the digital video capture according to the proposed invention.

i refers to an image number of a digital video capture.

$t_i$ refers to the time of capture corresponding to the beginning of the exposure of image i of a typical digital video capture.

$\hat{t}_i$ refers to the time of capture corresponding to the beginning of the exposure of image i of a digital video capture according to the proposed invention.

$e^a(t_i)$ refers to the auto-exposure measurement at time $t_i$.

f refers to the image (frame) rate of a typical digital video capture.

$e_{max}$ refers to the maximum exposure allowed for a single digital video image in a typical digital video capture.

$\hat{f}$ refers to the image (frame) rate of a digital video capture according to the present invention.

$\hat{e}_{max}$ refers to the maximum exposure allowed for a single digital video image in a digital video capture according to the present invention.

$e(t_i)$ refers to the exposure time for the image at time $t_i$ of a typical digital video capture $\hat{e}(t_i)$ refers to the exposure time for the image at time $t_i$ of a digital video capture according to the present invention.

b refers to the number of images being combined.

n refers to the blur reduction factor.

Figure 6:
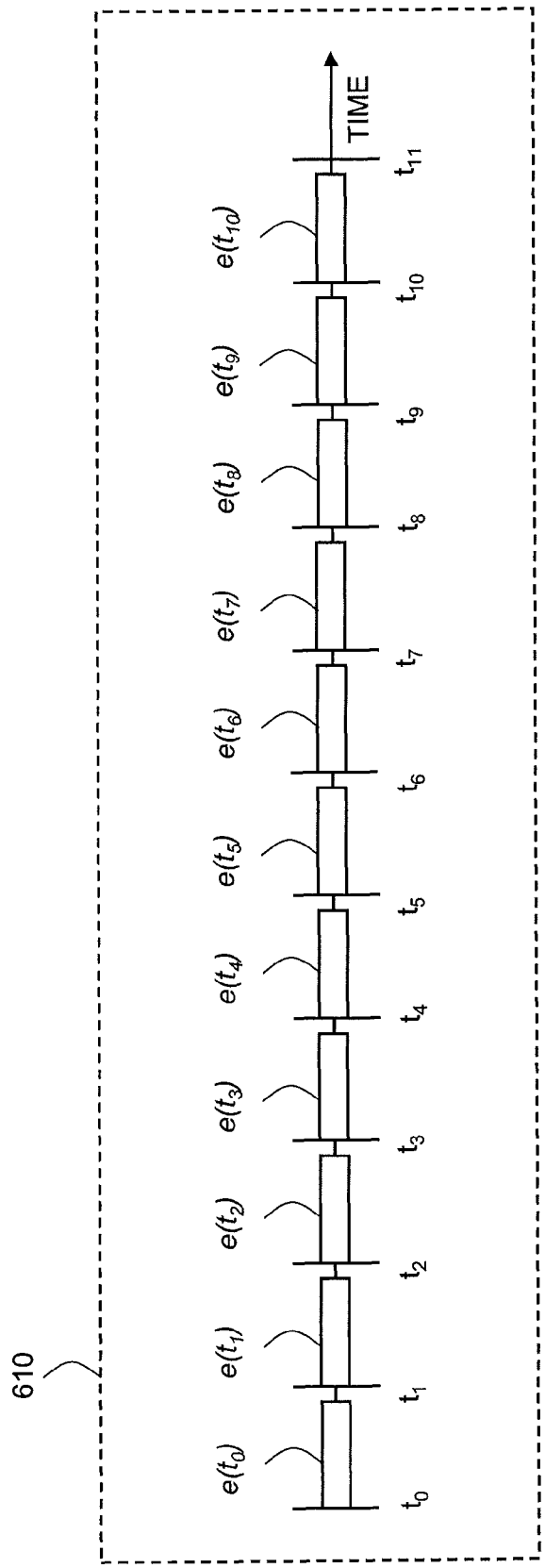
FIG. 6 is an illustration of a Prior Art video capture.

In FIG. 6, a Prior Art or typical digital video capture is represented 610. Each digital video image, i, has an associated exposure start time, $t_i$, as well as an associated exposure time, $e(t_i)$. The exposure time for each digital video image, i, is a function of the auto-exposure measurement at that time, $e^a(t_1)$. It is also a function of the maximum allowable exposure time, $e_{max}$, for a single digital video image. This maximum allowable exposure time is inversely related to the image rate, f, of the digital video capture. For example, for a digital video capturing images at an image rate of 30 images per second, the maximum allowable exposure time $e_{max}$ for a single image is 1/30 second. Thus the exposure time for a given digital video image in the typical digital video capture is given as $e(t_i)=\min(e^a(t_i),e_{max})$. When there is sufficient light in the scene, the determined auto-exposure measurement is less than the maximum allowed exposure time, and the image can be effectively exposed with a single capture (b=1). When there is insufficient light in the scene, the exposure time is limited to $e_{max}$ and the resulting single digital video image is dark. It is important to note that motion is not considered in the Prior Art digital video capture, as such the method does not adapt the capture conditions in response to motion of the device or motion of objects on the scene.

Figure 7:
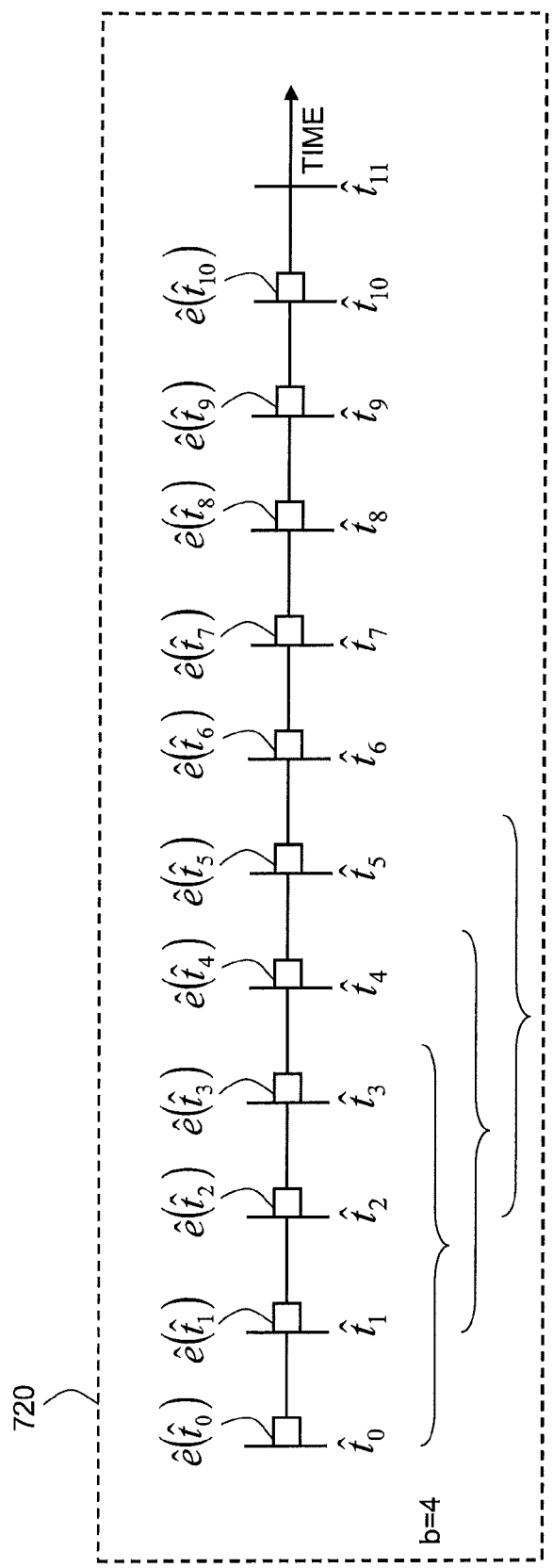
FIG. 7 is an illustration of a video capture according to the present invention.

In FIG. 7, a digital video capture 720 according to the proposed invention is represented. In this example, the exposure time for a given digital video image is reduced by a factor of 4 as compared to the exposure time for a typical digital video capture. That is, n=4, and the exposure time for a given digital video image is given by:

$$\hat{e}(\hat{t}_i) = \frac{e(t_i)}{4}.$$

The image rate, f, of the typical digital video capture 610 is the same as the image rate, $\hat{f}$, of the improved digital video capture 720. Additionally, the start time for the capture of each digital video image is the same for both the typical 610 and the improved video 720 captures. That is, $t_i=\hat{t}_i$. However, in the example of the improved digital video capture 720 shown, four images are combined to form each improved digital video image. That is, b=4. In this example, the overall brightness of the video produced remains the same as the Prior Art 610, as each digital video image has only one-fourth the typical exposure, but four images are combined to form each improved digital video image. However, the improved digital video images have reduced motion blur resulting from exposing each digital video image for one-fourth the typical exposure time. These settings can be used in a scenario with sufficient lighting and significant object motion. In such a case, video quality is improved by reducing object motion blur while maintaining brightness.

Figure 8:
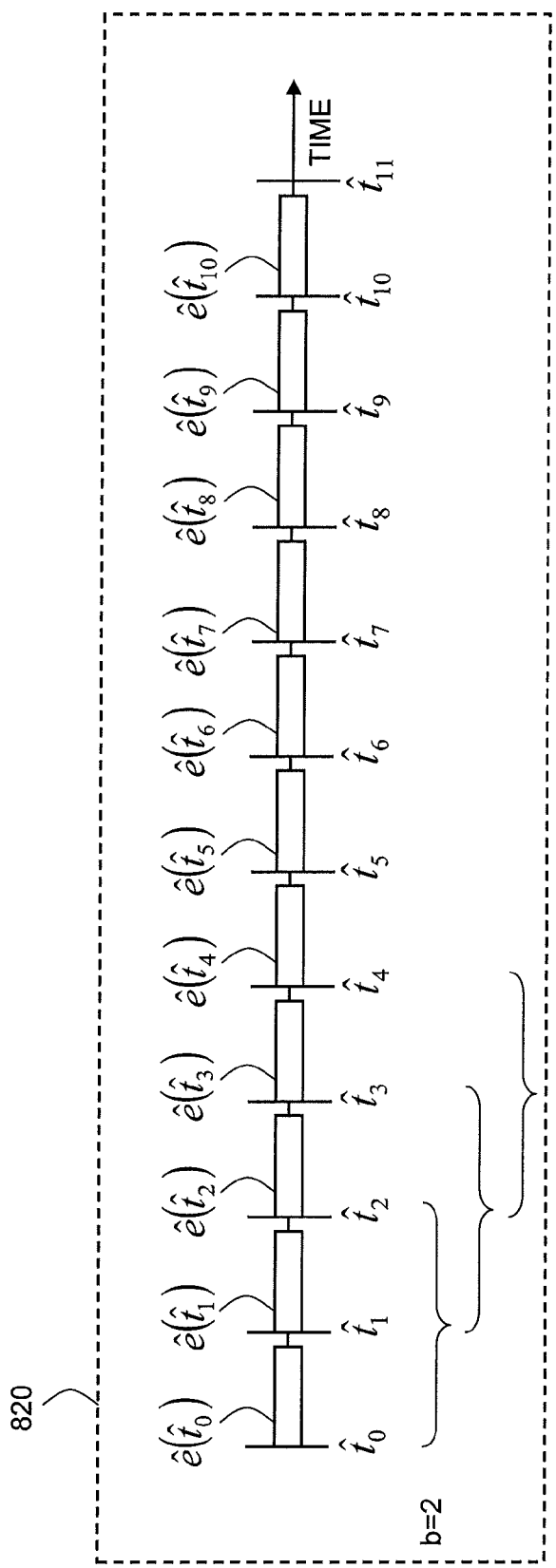
FIG. 8 is an illustration of a video capture according to the present invention.

FIG. 8 illustrates another possible digital video capture according to the present invention. In 820, a digital video capture according to the proposed invention is represented. In this example 820, the exposure time for a given digital video image is not reduced compared to the Prior Art digital video capture 610. The exposure time for a given digital video image is then: $\hat{e}(\hat{t}_i)=e(t_i)$. This exposure can still be reduced relative to the auto-exposure calculation, however, such that n>1, if $e^a(t_i)>e^a(t_i)$. In addition, the image rate, f, of the typical digital video capture is the same as the image rate, $\hat{f}$, of the improved digital video capture. Also, the start time of capture of each digital video image is the same for both the typical and improved digital video captures. That is, $t_i=\hat{t}_i$. In the example 820 shown, two digital video images are combined to form each improved digital video image. That is, b=2. In this example, the overall brightness of the video is increased by a factor of two, as each digital video image has the typical exposure time, but two digital video images are combined to form each improved digital video image. The improved digital video images have similar motion blur as occurring for the Prior Art digital video images as both use the typical exposure time. These settings can be used in a scenario with insufficient lighting ($e^a(t_i)>e(t_i)$) and tolerable or low object motion. In such a case, video quality is improved by improving brightness while avoiding additional object motion blur as would be encountered if the exposure time was simply increased for each digital video capture.

Figure 9:
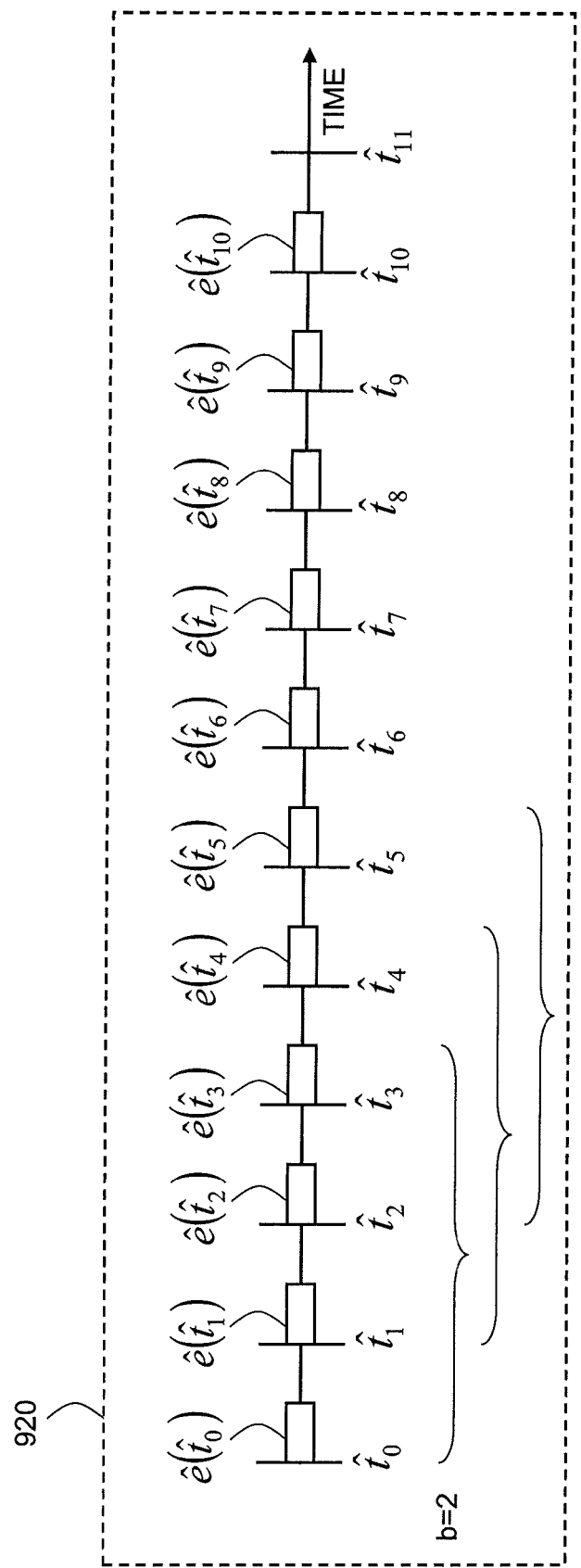
FIG. 9 is an illustration of a video capture according to the present invention.

FIG. 9 illustrates another possible digital video capture according to the present invention. In 920, a digital video capture according to the proposed invention is represented. In this example, the exposure time for a given digital video image is reduced by a factor of 2. That is, n≥2 (greater than 2 in the case that $e^a(t_i)>e(t_i)$), and the exposure time for a given digital video image is given by:

$$\hat{e}(\hat{t}_i) = \frac{e(t_i)}{2}.$$

The image rate, f, of the typical digital video capture 610 is the same as the image rate, f̂, of the improved digital video capture 920. Additionally, the start time of the exposures for each digital video image is the same for both the typical 610 and improved 920 digital video captures. That is, $t_i = \hat{t}_i$. In the example 920 shown, four images are combined to form each improved digital video image. That is, b=4. In this example, the overall brightness of the video is increased by a factor of two, as each digital video image has one-half the typical exposure time, but four images are combined to form each improved digital video image. The improved digital video images also have reduced motion blur resulting from exposing each digital video image for one-half the typical exposure time. These settings can be used in a scenario with insufficient lighting ($e^a(t_i) > e(t_i)$) and objectionable or high object motion. In such a case, video quality is improved by improving brightness and reducing object motion blur.

The factor by which an exposure is reduced, n, can be changed one or more times during the video capture according to detected motion or lighting conditions. For example, as the magnitude of detected motion increases, n can be increased to prevent an associated increase in motion blur.

Similarly, the number of images being combined, b, can be changed one or more times during the video capture according to detected motion or lighting conditions. For example, as the available light decreases, b can be increased to prevent an associated increase in noise in the video.

The invention has been described in detail with particular reference to certain preferred embodiments thereof, but it will be understood that variations and modifications are effected within the spirit and scope of the invention.

PARTS LIST

1 Lens
2 Optical lowpass filter
3 Electronic image sensor
4 A/D converter
5 Digital image processor
6 Motion processor
7 CFA interpolator
9 Pixel combiner
10 Object motion detector
11 Image combiner
12 A red pixel belonging to the first red sub-array
13 A red pixel belonging to the first red sub-array
14 Image aligner
15 Image portion replacer
105 Step to capture a new image
110 Step to manage the rolling buffer
115 Step to combine pixels in one image
118 Step to produce a motion map
120 Step to combine multiple images
122 Step to produce an improved digital video image
125 Step to store or transmit the improved digital video image
205 Step to capture a new image
210 Step to manage the rolling buffer
212 Step to select a reference image
214 Step to align the multiple images
215 Step to combine pixel values in the reference image
218 Step to produce a motion map
220 Step to combine the aligned multiple images
222 Step to produce an improved digital video image
225 Step to store or transmit the improved digital video image
510 Video capture initiation
520 Video image capture
530 Query for b images in rolling buffer
540 Image addition to rolling buffer
550 Query for b images in rolling buffer
560 Video image alignment and combining steps
570 Image replacement in rolling buffer
610 Prior Art video capture mode
720 Improved video capture mode
820 Improved video capture mode
920 Improved video capture mode

The invention claimed is:

1. A method for providing a digital video of a scene with at least one of reduced motion blur or increased brightness, using a digital image processor to provide operations, comprising:
   determining for a digital video capture an exposure time for each digital video image based on brightness measurements of the scene;
   capturing each digital video image with a reduced exposure time that is 1/n of the determined exposure time for the digital video image, wherein n is greater than 1;
   selecting a first series of at least x sequential images within the digital video capture, wherein x is greater than 1, wherein x is selected based on scene brightness, and wherein x is changed during the video capture based on detected scene brightness;
   combining pixel values of the selected first series of sequential images to produce a first intermediate image that is brighter than each of the selected sequential images;
   assigning one of the selected sequential images as a reference image, and processing the reference image to create a second intermediate image which is brighter than the reference image and which has less motion blur than the first intermediate image;
   identifying moving regions among the selected sequential images;
   replacing the pixel values of the moving regions in the first intermediate image with pixel values from corresponding regions from the second intermediate image to thereby produce a first digital video image having at least one of reduced motion blur or increased brightness;
   repeating steps of selecting, combining, identifying, and replacing for a second series of sequential images that includes at least one image from the first series of sequential images to produce a second digital video image having at least one of reduced motion blur or increased brightness; and
   storing or transmitting the video including the first and second digital video images with at least one of reduced motion blur or increased brightness.

2. The method of claim 1, wherein selecting a first series of at least x sequential images comprises aligning the selected sequential images.

3. The method of claim 1, wherein the x selected images are consecutive images.

4. The method of claim 1, further comprising changing n during the video capture based on detected motion.

5. The method of claim 1, further comprising displaying the video.

6. The method of claim 1, wherein x is equal to four.

7. The method of claim 1, wherein a frame rate of the digital video capture and a frame rate of the video including the first and second digital video images are the same.

8. The method of claim 7, wherein the frame rate of the digital video capture before changing the x is the same as the frame rate of the digital video capture after changing the x.

9. The method of claim 7, wherein the frame rate of the video including the first and second digital video images before changing the x is the same as the frame rate of the video including the first and second digital video images after changing the x.

10. A system comprising:
one or more electronic processors configured to:
determine for a digital video capture an exposure time for each digital video image based on brightness measurements of the scene;
capture each digital video image with a reduced exposure time that is 1/n of the determined exposure time for the digital video image, wherein n is greater than 1;
select a first series of at least x sequential images within the digital video capture, wherein x is greater than 1, wherein x is selected based on scene brightness, and wherein x is changed during the video capture based on detected scene brightness;
combine pixel values of the selected first series of sequential images to produce a first intermediate image that is brighter than each of the selected sequential images;
assign one of the selected sequential images as a reference image, and processing the reference image to create a second intermediate image which is brighter than the reference image and which has less motion blur than the first intermediate image;
identify moving regions among the selected sequential images;
replace the pixel values of the moving regions in the first intermediate image with pixel values from corresponding regions from the second intermediate image to thereby produce a first digital video image having at least one of reduced motion blur or increased brightness;
repeat the selecting, combining, identifying, and replacing for a second series of sequential images that includes at least one image from the first series of sequential images to produce a second digital video image having at least one of reduced motion blur or increased brightness; and
store or transmit the video including the first and second digital video images with at least one of reduced motion blur or increased brightness.

11. The system of claim 10, wherein the one or more processors are configured to align the selected sequential images.

12. The system of claim 10, wherein the x selected images are consecutive images.

13. The system of claim 10, wherein the one or more processors are further configured to change n during the video capture based on detected motion.

14. The system of claim 10, wherein the one or more processors are further configured to display the video.

15. The system of claim 10, wherein x is equal to four.

16. A non-transitory computer readable medium having instructions stored thereon, the instructions comprising:
instructions to determine for a digital video capture an exposure time for each digital video image based on brightness measurements of the scene;
instructions to capture each digital video image with a reduced exposure time that is 1/n of the determined exposure time for the digital video image, wherein n is greater than 1;
instructions to select a first series of at least x sequential images within the digital video capture, wherein x is greater than 1, wherein x is selected based on scene brightness, and wherein x is changed during the video capture based on detected scene brightness;
instructions to combine pixel values of the selected first series of sequential images to produce a first intermediate image that is brighter than each of the selected sequential images;
instructions to assign one of the selected sequential images as a reference image, and processing the reference image to create a second intermediate image which is brighter than the reference image and which has less motion blur than the first intermediate image;
instructions to identify moving regions among the selected sequential images;
instructions to replace the pixel values of the moving regions in the first intermediate image with pixel values from corresponding regions from the second intermediate image to thereby produce a first digital video image having at least one of reduced motion blur or increased brightness;
instructions to repeat the selecting, combining, identifying, and replacing for a second series of sequential images that includes at least one image from the first series of sequential images to produce a second digital video image having at least one of reduced motion blur or increased brightness; and
instructions to store or transmit the video including the first and second digital video images with at least one of reduced motion blur or increased brightness.

17. The non-transitory computer readable medium of claim 16, wherein the instructions further comprise instructions to align the selected sequential images.

18. The non-transitory computer readable medium of claim 16, wherein the x selected images are consecutive images.

19. The non-transitory computer readable medium of claim 16, the instructions further comprise instructions to change n during the video capture based on detected motion.

20. The non-transitory computer readable medium of claim 16, the instructions further comprise instructions to display the video.

* * * * *